(12) United States Patent  
Soubaras

(10) Patent No.: US 10,782,430 B2  
(45) Date of Patent: Sep. 22, 2020

(54) METHOD FOR SEISMIC EXPLORATION USING A MULTIPLE-INCLUSIVE SOURCE WAVELET

(71) Applicant: CGG SERVICES SAS, Massy (FR)

(72) Inventor: Robert Soubaras, Orsay (FR)

(73) Assignee: CGG SERVICES SAS, Massy (FR)

( * ) Notice: Subject to any disclaimer, the term of this patent is extended or adjusted under 35 U.S.C. 154(b) by 308 days.

(21) Appl. No.: 15/989,450

(22) Filed: May 25, 2018

(65) Prior Publication Data

US 2019/0219715 A1  Jul. 18, 2019

Related U.S. Application Data

(60) Provisional application No. 62/616,541, filed on Jan. 12, 2018.

(51) Int. Cl.  
*G01V 1/28* (2006.01)  
*G01V 1/30* (2006.01)

(52) U.S. Cl.  
CPC .............. *G01V 1/282* (2013.01); *G01V 1/307* (2013.01); *G01V 2210/67* (2013.01)

(58) Field of Classification Search  
CPC .... G01V 1/282; G01V 1/307; G01V 2210/67; G01V 1/303; G01V 2210/1293; G01V 2210/1423; G01V 1/28; G01V 1/306  
See application file for complete search history.

(56) References Cited

U.S. PATENT DOCUMENTS

| | | | |
|---|---|---|---|
| 8,593,904 B2 | 11/2013 | Soubaras | |
| 8,694,299 B2 * | 4/2014 | Krebs | G01V 11/00 |
| | | | 703/10 |
| 8,892,410 B2 * | 11/2014 | Krohn | G01V 1/30 |
| | | | 703/5 |
| 9,013,956 B2 * | 4/2015 | Hill | G01V 1/282 |
| | | | 367/73 |
| 9,588,244 B2 * | 3/2017 | Nemeth | G01V 1/30 |
| 9,857,488 B2 * | 1/2018 | Lu | G01V 1/282 |
| 9,910,189 B2 * | 3/2018 | Dickens | G01V 99/00 |
| 10,185,046 B2 * | 1/2019 | Anderson | G01V 1/36 |

(Continued)

FOREIGN PATENT DOCUMENTS

WO  2004095074 A2  11/2004

OTHER PUBLICATIONS

British Search Report, dated Nov. 30, 2018, for British Application No. GB1808827.8.

(Continued)

*Primary Examiner* — Mohammad K Islam  
(74) *Attorney, Agent, or Firm* — Patent Portfolio Builders PLLC

(57) ABSTRACT

A method for exploring a geological formation estimates a multiple-inclusive source wavelet and a reflectivity model by performing an inversion minimizing the difference between the shot records and modeled shots. The modeled shots, that include primaries and multiples, are obtained by propagating up-going and down-going wavefields through an input velocity model, which is not updated during the inversion. The shot records are converted into a geological product suitable for hydrocarbon exploration in the geological formation using the multiple-inclusive source wavelet and the reflectivity model.

20 Claims, 7 Drawing Sheets

(56) References Cited

U.S. PATENT DOCUMENTS

| | | | |
|---|---|---|---|
| 10,459,117 B2* | 10/2019 | Baumstein | G01V 99/005 |
| 2009/0257308 A1* | 10/2009 | Bevc | G01V 1/303 |
| | | | 367/53 |
| 2012/0243373 A1* | 9/2012 | Shin | G01V 1/282 |
| | | | 367/73 |
| 2014/0358504 A1* | 12/2014 | Baumstein | G01V 99/005 |
| | | | 703/2 |
| 2015/0109881 A1* | 4/2015 | Poole | G01V 1/364 |
| | | | 367/7 |
| 2016/0025878 A1* | 1/2016 | Shin | G01V 1/282 |
| | | | 367/7 |
| 2016/0334270 A1* | 11/2016 | Van Manen | G01V 1/364 |
| 2017/0219729 A1* | 8/2017 | Yan | G01V 1/362 |
| 2017/0307770 A1* | 10/2017 | Baumstein | G01V 1/303 |
| 2019/0094399 A1* | 3/2019 | Yilmaz | G01V 1/345 |

OTHER PUBLICATIONS

Wang, K., et al., "Simultaneous full-waveform inversion for source wavelet and earth model," SEG Houston 2009 International Exposition and Annual Meeting, SEG Technical Program Expanded Abstracts, Oct. 2009, pp. 2537-2541.

Hussain I. Hammad et al., "Non-Linear Model-Independent Joint Migration Inversion", SEG International Exposition and 87th Annual Meeting, Sep. 24-27, 2017, Houston, Texas, pp. 5556-5560.

M. Davydenko et al., "Full-wavefield migration: using surface and internal multiples in imaging", Geophysical Prospecting, 2016, pp. 1-15.

M. Davydenko et al., "Including and using internal multiples in closed-loop imaging—field data examples", Geophysics, Mar. 23, 2018, pp. 1-35.

R. Soubaras et al., "Mitigating the gradient artefacts of Migration Velocity Analysis by Gauss-Newton update", 79th EAGE Conference & Exhibition, Jun. 12-15, 2017, Paris, France.

* cited by examiner (a)

(b)

(a)

(b)

900

METHOD FOR SEISMIC EXPLORATION USING A MULTIPLE-INCLUSIVE SOURCE WAVELET

CROSS-REFERENCE TO RELATED APPLICATIONS

The present application is related to and claims the benefit of priority of U.S. Provisional Application 62/616,541 filed Jan. 12, 2018, the entire contents of which are incorporated herein by reference.

BACKGROUND

Technical Field

Embodiments of the subject matter disclosed herein generally relate to methods and systems for exploring a subsurface geological formation, and, in particular, to methods and systems that use shot records in a joint inversion yielding a source wavelet and a reflectivity model without changing the velocity model.

Discussion Of The Background

Probing underground formations in search of hydrocarbon resources is an ongoing process driven by continually increasing worldwide demand. Seismic surveys are used for exploration, hydrocarbon reservoir field development, and production monitoring (time lapse).

During seismic data acquisition, sensors detect acoustic signals emerging from the geological formation following shots fired by a source. The sensors sample the signals to record series of signal amplitudes versus time (known as traces), which carry information about the geological formation's structure. The interaction of the seismic excitation generated by the source inside the geological formation includes reflections, which are refractions at boundaries between layers characterized by different seismic propagation velocities and attenuation. Note that "seismic" and "acoustic" are used interchangeably in this document while referring to mechanical waves (i.e., propagating oscillations) and, thus, to propagating mechanical energy.

"Shot record" is a term used for all the sensor-generated records following a shot. The seismic "illumination" of the geological formation due to the shot provides a snapshot of the formation's structure, according to the source and sensors' positions. The shot record is processed to determine physical properties of the geological formation's illuminated portion; these physical properties may indicate the presence and location of hydrocarbon (i.e., oil and/or gas) reservoirs.

A model of velocity (i.e., velocity values inside the geological formation) may be used during the processing. Migration velocity analysis (MVA) uses migration to estimate reflectivity from the shot records and improves the velocity model by optimizing the reflectivity according to a particular criterion. MVA has the drawback of being hampered by gradient artifacts that prevent convergence. Another difficulty is that MVA may be affected by the presence of multiples. Therefore, seismic data (i.e., shot records) is usually pre-processed before applying MVA. Conventionally, pre-processing prepares data for MVA, which then obtains the velocity model and the reflectivity. However, the pre-processing is quite challenging for broadband processing, requiring extra care to preserve signal at the lower frequencies.

Conventional pre-processing includes separate steps of source deconvolution, source de-ghosting, sensor de-ghosting, and surface-related multiple attenuation/removal. All these steps have the potential of altering the structural information.

Thus, there is a need to propose methods and systems that, unlike the conventional approach, use the shot records (i.e., original, not pre-processed) during processing to extract structural information (e.g., inversions).

SUMMARY

Methods and devices according to various embodiments jointly estimate a multiple-inclusive source wavelet and a reflectivity model by performing an inversion, minimizing the difference between the shot records and modeled shots. The modeled shots include primaries, ghosts and multiples, thereby using the raw data (not pre-processed for removing the multiples) when obtaining a geological product suitable for hydrocarbon exploration in the geological formation.

According to an embodiment, there is a method for exploring a geological formation. The method includes obtaining shot records generated by sensors detecting signals emerging from the geological formation following shots fired by a source, and a velocity model of the geological formation. The method further includes jointly estimating a multiple-inclusive source wavelet and a reflectivity model by performing an inversion minimizing difference between the shot records and modeled shots, the modeled shots including primaries and multiples obtained by propagating up-going and down-going wavefields through the velocity model that is not updated during the inversion. The method then includes converting the shot records into a geological product suitable for hydrocarbon exploration in the geological formation using the multiple-inclusive source wavelet and the reflectivity model.

According to another embodiment, there is a seismic exploration apparatus configured to convert shot records acquired for a geological formation into a geological product suitable for hydrocarbon exploration in the geological formation. The apparatus includes an interface configured to receive shot records generated by sensors detecting signals emerging from the geological formation following shots fired by a source, and a velocity model. The apparatus also includes a processing module connected to the interface and configured to jointly estimate a multiple-inclusive source wavelet and a reflectivity model by performing an inversion minimizing difference between the shot records and modeled shots, the modeled shots including primaries and multiples obtained by propagating up-going and down-going wavefields through the velocity model that is not updated during the inversion, and to convert the shot records into a geological product suitable for hydrocarbon exploration in the geological formation using the multiple-inclusive source wavelet and the reflectivity model.

According to yet another embodiment, there is a non-transitory computer-readable medium storing executable codes which, when executed by a computer, make the computer perform a method for exploring a geological formation. The method includes obtaining shot records generated by sensors detecting signals emerging from the geological formation following shots fired by a source, and a velocity model of the geological formation. The method further includes jointly estimating a multiple-inclusive source wavelet and a reflectivity model by performing an inversion minimizing difference between the shot records and modeled shots, the modeled shots including primaries and multiples obtained by propagating up-going and down-going wavefields through the velocity model that is not updated during the inversion. The method then includes converting the shot records into a geological product suitable for hydrocarbon exploration in the geological formation using the multiple-inclusive source wavelet and the reflectivity model.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of marine seismic surveys. However, the inventive concepts to be discussed next are not limited to marine seismic surveys, but they may also be applied for land surveys and surveys with electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
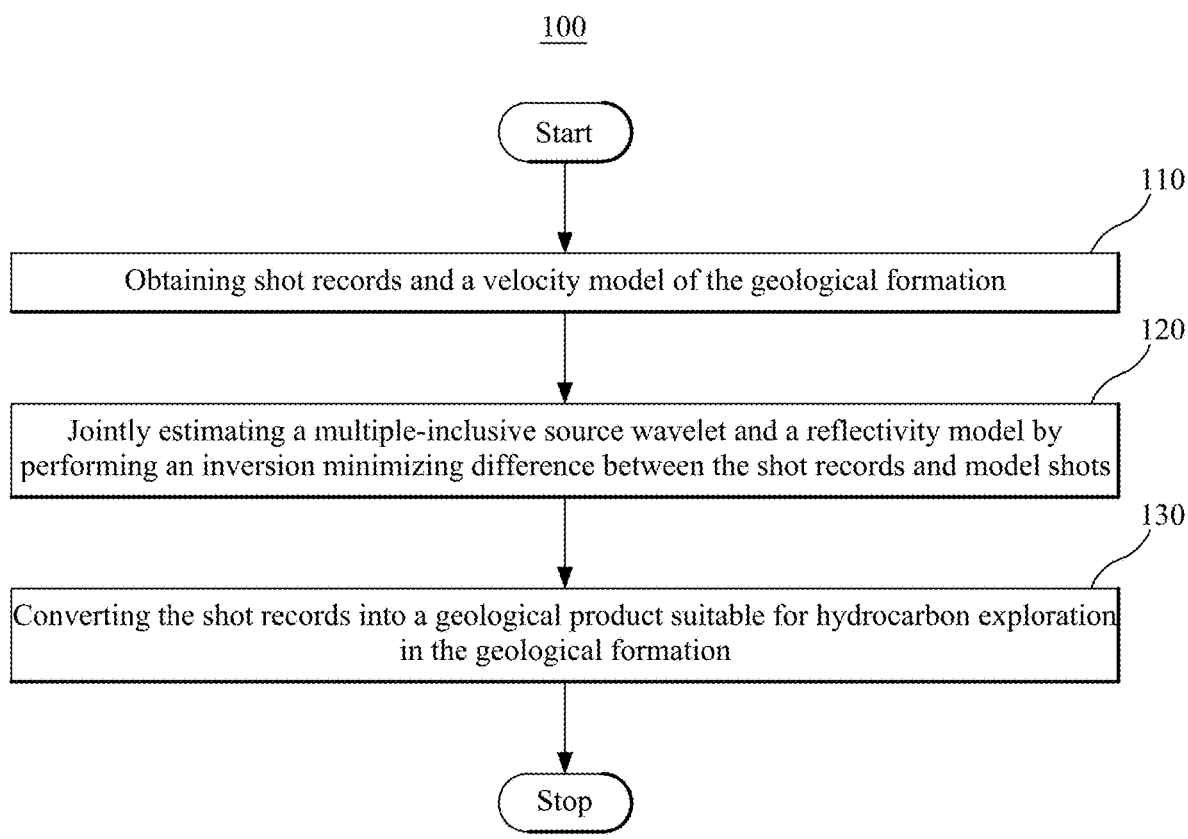
FIG. 1 is a flow diagram of a method according to an exemplary embodiment.

An alternative to conventional pre-processing is to include in a forward modeling of the source wavelet (without ghost) the source and sensor ghosts and the multiples in order to perform an inversion using raw data (i.e., the shot records). FIG. 1 is a flow diagram of a method 100 for exploring a geological formation according to an exemplary embodiment.

Method 100 first includes obtaining shot records and a velocity model of the geological formation at 110. The shot records are generated by sensors detecting signals emerging from the geological formation following shots fired by a source. Some details related to step 110 are discussed next, before presenting the other steps of method 100.

Figure 2:
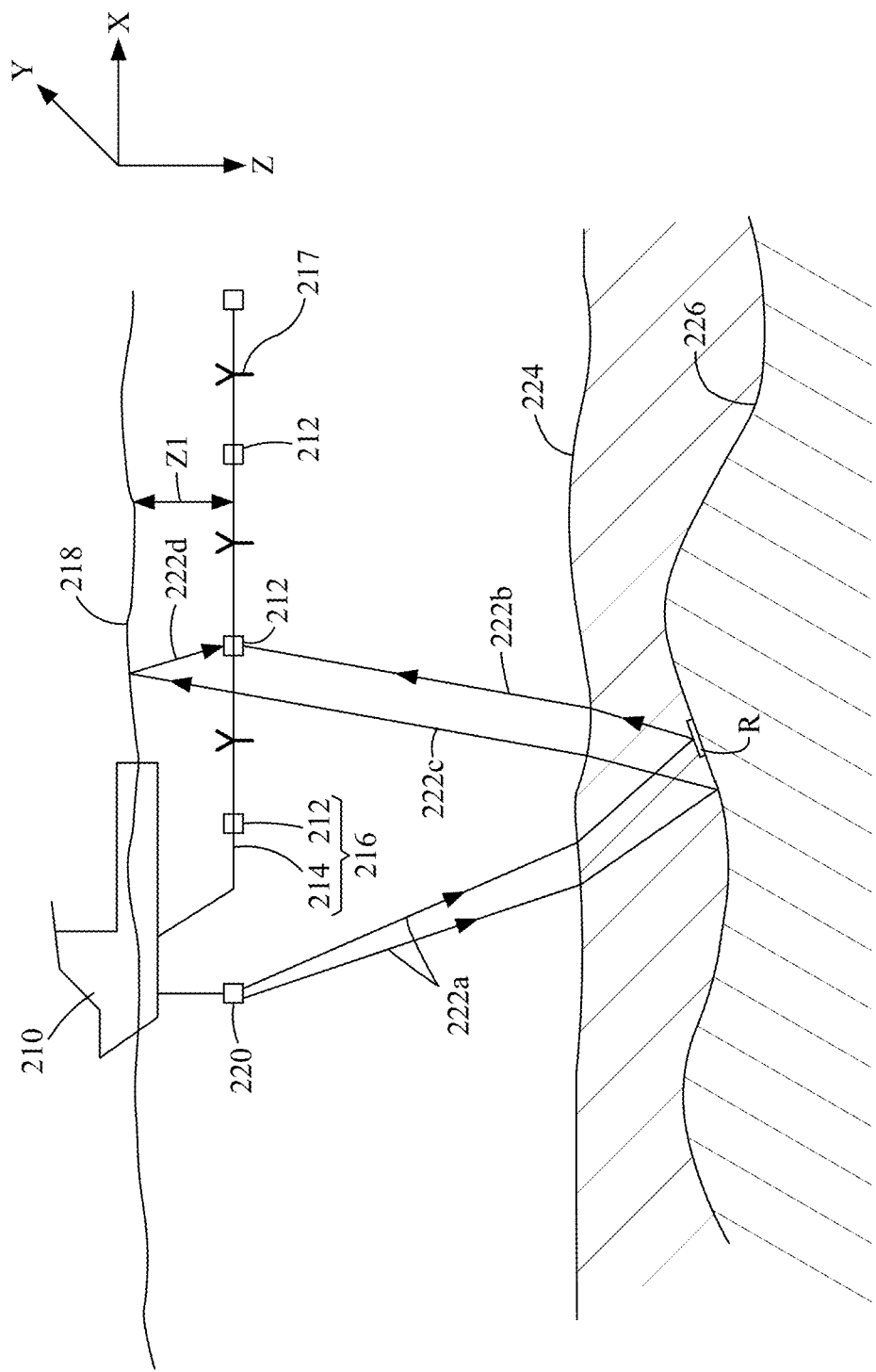
FIG. 2 is schematic diagram of a marine seismic data acquisition system.

FIG. 2 illustrates a marine seismic data acquisition system that acquires such shot records. In FIG. 2, vessel 210 tows plural seismic sensors 212, which are disposed along a flexible cable 214 (typically several kilometers long) and configured to detect seismic signals emerging from the explored geological formation. Those skilled in the art use the term "streamer" (labeled 216) for the cable and the corresponding sensors. A vessel usually tows plural streamers at predetermined cross-line intervals (cross-line being a direction perpendicular to the towing direction), with the streamers forming a spread in the horizontal (xy) plane. Streamer 216 is towed at a substantially constant depth $z_1$ relative to the water surface 218. However, streamers may be towed at a slant (i.e., to form a constant angle) with respect to the water surface, or may have a curved profile as described, for example, in U.S. Pat. No. 8,593,904, the entire content of which is incorporated herein by reference. Each streamer is normally equipped with compasses, acoustic pingers and depth sensors that give continuous location information about heading, position and depth. Furthermore, each streamer is typically equipped with attached units 217 (only one labeled) known as "birds" that control the cross-line position and depth of that streamer (control operations often referred to as streamer steering). Although FIG. 2 illustrates marine data acquisition, the current inventive concept can be applied to land as well, for example, for interbed multiples.

Vessel 210 (or another vessel) may also tow seismic source 220 configured to generate acoustic waves 222a. Acoustic waves 222a propagate downward and penetrate the seafloor 224. For simplicity, FIG. 2 shows only two paths 222a corresponding to the source-emitted acoustic waves. When encountering a layer interface 226 (the interface separating layers inside into which the acoustic waves propagate with different velocities), the acoustic waves are at least partially reflected. Reflected acoustic waves 222b and 222c propagate upward. Reflected acoustic wave 222b is received by one of sensors 212, while reflected wave 222c passes by the sensors and is reflected back at the water surface 218 (i.e., the interface between the water and air serving as a quasi-perfect reflector to the acoustic waves). Wave 222d, which is wave 222c's reflection at the water surface, travels downward and is then also detected by the sensors.

Figure 3:
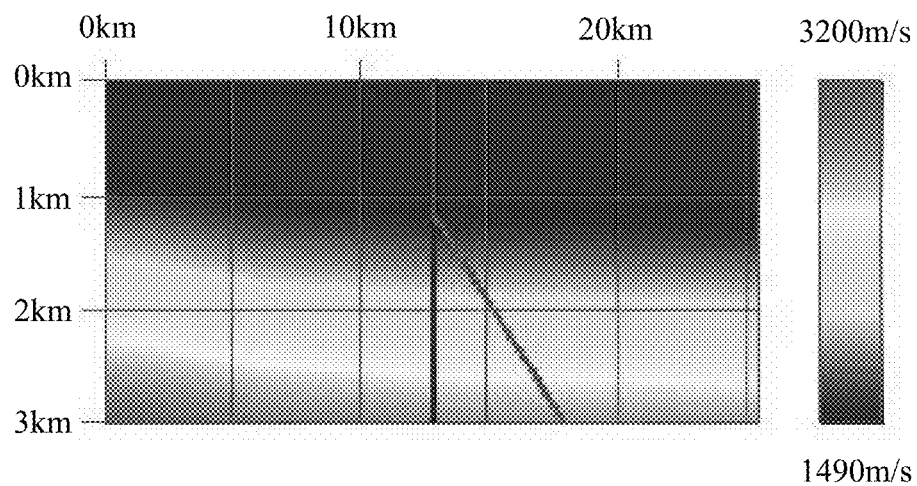
FIG. 3 is a vertical slice in a velocity model.

A velocity model means velocity values are attributed to a three-dimensional (3D) representation of the explored underground formation. For example, FIG. 3 represents a vertical slice in a velocity model where different nuances of gray correspond to different velocity values.

Returning now to FIG. 1, method 100 then includes estimating a multiple-inclusive source wavelet and a reflectivity model by performing an inversion minimizing the difference between the shot records and modeled shots at 120. Here, "multiple-inclusive" is a label signaling that the methods of this embodiment use the raw data including multiples. The modeled shots include direct arrivals, primaries, ghosts and multiples obtained by propagating up-going and down-going wavefields through the velocity model, which is not updated during this inversion. Computing the modeled shots may use one-way wave-equation propagation, and may include:

modeling the source with the wavelet, building an initial down-going wavefield with the source ghost, propagating the down-going wavefield through the velocity model, obtaining an up-going wavefield with the reflectivity model, reflecting the up-going field at the water surface (or another surface boundary), and generating components of the model shot by adding the up-going field and the other down-going wavefield at locations of the sensors.

The up and down propagation may be repeated N times, N being the multiple order (which may be user-defined and varied). Mathematically, each modeled trace $m_i(t)$ is therefore the sum of 2N+1 components ($dw_0(t)$ being the direct arrival):

$$m_i = dw_0 + \sum_{n=1}^{N} [up_n(t) + dw_n(t)]. \qquad (1)$$

Since the shot modeling takes into account the source wavelet, the reflectivity, the ghosts and the multiples, the inversion can in principle perform pre-processing, velocity estimation and imaging steps. The inversion uses a cost function and calculates a gradient of the cost function with respect to parameters used in computing the modeled shot. The gradient may be used to iteratively update one or more of the source wavelet, the velocity model, and the reflectivity model. However, when all three terms (i.e., the source wavelet, the velocity model and the reflectivity) are estimated jointly, the inversion starting from crude initial estimates may fail to converge.

The inversion uses an initial velocity model. This model may be very crude, for example, considering the water velocity or linear gradient from the water-bottom constant. The inversion jointly estimates the source wavelet and an unconstrained extended reflectivity using, for example, a cost function that minimizes misfit between data (i.e., shot records) and modeled shots:

$$C(r, v) = \frac{1}{2}[G(v)r - d_0]^*[G(v)r - d_0] \qquad (2)$$

with do the recorded data, v the velocity model, r the reflectivity, and G(v) the modeling operator that produces the modeled data d with the linear modeling equation d=G(v)r.

The data is correctly modeled because the unconstrained extended reflectivity compensates for the errors in the velocity model and takes into account the AVA effects. This inversion may be seen as corresponding to pre-processing because once the modeled traces are obtained using the above equation for $m_i(t)$, the 2N+1 components of this model, which are models of the ghosts and of the multiples, can be used for de-ghosting and multiple attenuation. The velocity model is not updated (i.e., it is "frozen") during this first inversion.

Returning yet again to FIG. 1, method 100 finally includes, at 130, converting the shot records into a geological product suitable for hydrocarbon exploration in the geological formation using the multiple-inclusive source wavelet and the reflectivity model obtained at 120. Here, the term "geological product" refers to any geological aspects used for an exploration-related decision. For example, a geological product may be changes in a volume including an oil and gas reservoir, presence and direction of fractures, identification of layers' type so as to select a drilling location and/or design a drilling path, etc.

In one embodiment, step 130 includes a second inversion, which jointly estimates the velocity model and a constrained extended reflectivity, using the wavelet which is frozen during this second inversion. The cost function used during this second inversion includes a reflectivity focusing term, in addition to the data misfit term in the first inversion:

$$C(r, v) = \frac{1}{2}[G(v)r - d_0]^*[G(v)r - d_0] + \frac{\sigma}{2}\|Ar\|^2 \qquad (3)$$

where $\sigma$ is a weight, and A is a matrix that extracts the extended part of the reflectivity. The two terms of this cost function are a data misfit term and a reflectivity focusing term.

This second inversion is similar to a migration velocity analysis (MVA) technique in which the velocity model is adjusted in order to focus the reflectivity. The MVA may utilize an extended reflectivity space.

Since the extended reflectivity space used in such an MVA technique allows the data misfit to be small from the first iteration, a second-order Gauss-Newton scheme can be used. The Gauss-Newton scheme involves simultaneously updating the velocity and reflectivity:

$$\begin{bmatrix} r_{n+1} \\ v_{n+1} \end{bmatrix} = \begin{bmatrix} r_n \\ v_n \end{bmatrix} - \lambda_n H_n^{-1}(r_n, v_n) g_n(r_n, v_n) \qquad (4)$$

using the gradient $g_n$ and an approximate Hessian $H_n$ of the cost function in the reflectivity model $r_n$ and velocity model $v_n$:

$$g_n(r_n, v_n) = \begin{bmatrix} \frac{\partial C}{\partial r_n^*} \\ \frac{\partial C}{\partial v_n^T} \end{bmatrix} = \begin{bmatrix} G^* \\ \frac{\partial (Gr_n)^*}{\partial v_n^T} \end{bmatrix} e + \sigma \begin{bmatrix} A^* A r_n \\ 0 \end{bmatrix} \qquad (5)$$

$$H(r_n, v_n) = \begin{bmatrix} G^* \\ \frac{\partial (Gr_n)}{\partial v_n^T} \end{bmatrix} \begin{bmatrix} G & \frac{\partial (Gr_n)}{\partial v_n} \end{bmatrix} + \sigma \begin{bmatrix} A^* A & 0 \\ 0 & 0 \end{bmatrix} \qquad (6)$$

Here, G is the velocity dependent Green-function matrix that applied to the extended reflectivity yields the data.

The deconvolution of the gradient tends to suppress gradient artifacts.

In one embodiment, a third inversion may be performed to estimate an enhanced, unconstrained extended reflectivity while freezing the wavelet and the velocity model. Accurate angle gathers can be produced from this final reflectivity. This third inversion, which may be considered as corresponding to imaging, also uses the raw shot records and ghosts and multiples modeling. Therefore, ghosts and multiples are used for the imaging, instead of being treated as noise.

Figure 4:
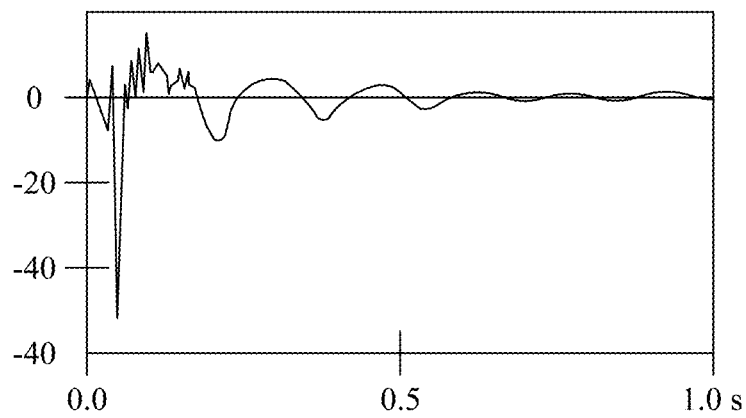
FIG. 4 illustrates a source wavelet.

As previously mentioned, FIG. 3 illustrates an exemplary crude initial velocity model adapted for use with exemplary raw shot records characterizing an exemplary 2D line acquired using a variable-depth streamer acquisition. In the acquisition, the sensors used were restricted to the first 3 km of the streamer, and the maximum frequency used was 80 Hz. The exemplary crude initial velocity is a linear gradient from the water bottom. The present inventive concepts seem similarly pertinent for 3D raw shot records. FIG. 4 illustrates a multiple-inclusive source wavelet obtained from an inversion that keeps the velocity model (e.g., the crude initial velocity model illustrated in FIG. 3) unchanged and estimates the source wavelet jointly with an extended reflectivity model. The vertical axis is the amplitude, which has the same scale as the data. If the data is correctly scaled to a given pressure unit, the source wavelet scale is the same unit. In practice, the data may have an arbitrary scale.

Figure 5:
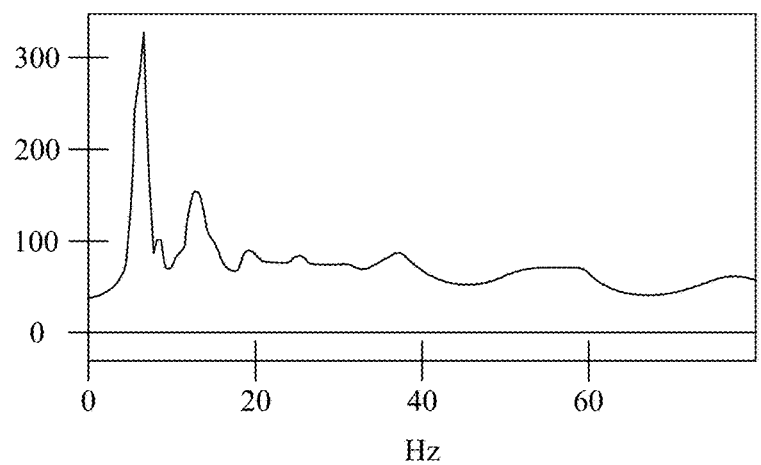
FIG. 5 is spectra of the source wavelet in FIG. 4.

FIG. 5 illustrates the spectrum of the estimated source wavelet in FIG. 4. The exemplary estimated source wavelet has an accurate time zero, scale and polarity. The time zero is the start of time scale in FIG. 4, which time does not coincide with the negative peak of the wavelet.

Figure 6:
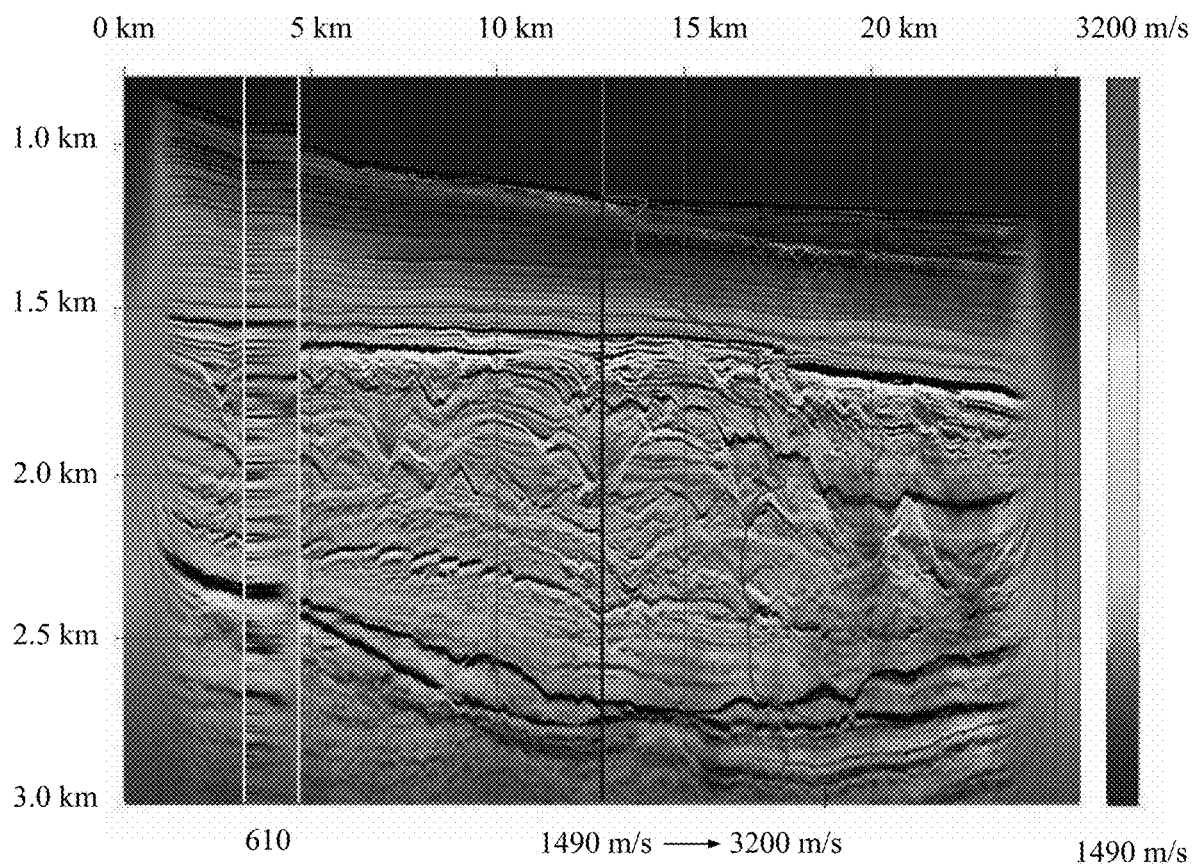
FIG. 6 an estimated velocity model obtained by a velocity modeling inversion which freezes the source wavelet while estimating the velocity model and the extended reflectivity model, according to an embodiment.

FIG. 6 exemplarily illustrates an estimated velocity model obtained by a velocity modeling inversion which freezes the estimated source wavelet (e.g., the source wavelet in FIG. 5) while estimating the velocity model and the extended reflectivity model. The velocity modeling inversion uses only a portion of the data up to 40 Hz.

Further, the reflectivity model is enhanced by performing a reflectivity modeling inversion in which the source wavelet (e.g., as illustrated in FIG. 4) and the velocity model (e.g., as illustrated in FIG. 6) are unchanged (i.e., frozen). The reflectivity modeling inversion used all the data (i.e., up to 80 Hz). The portion labeled 610 on FIG. 6 exemplarily illustrates angle gathers.

Figure 7:
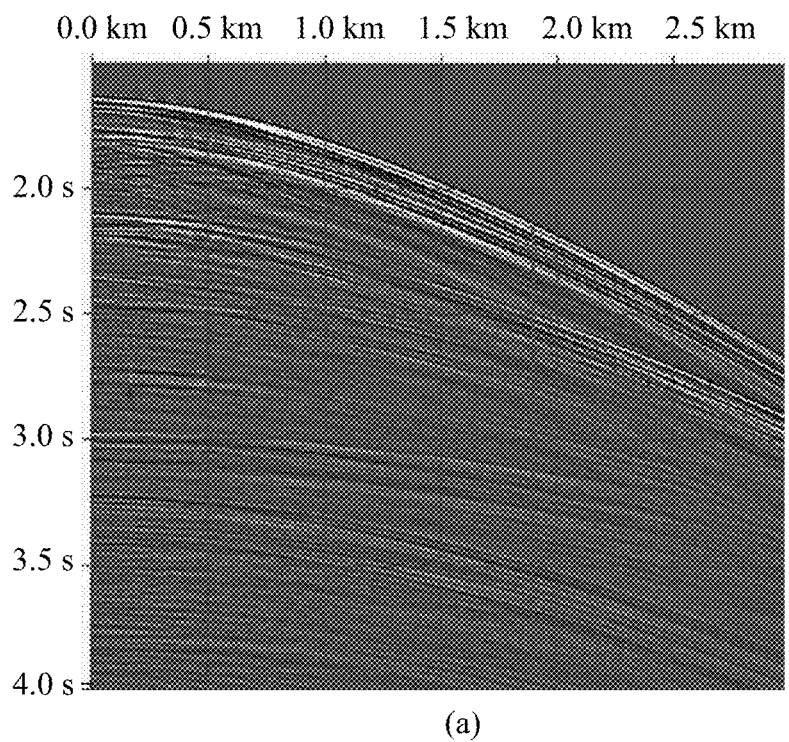
FIG. 7 illustrates (a) input raw shot and (b) the reconstructed shot obtained from (a) using the estimated source wavelet in FIG. 4, with the estimated velocity and reflectivity models illustrated in FIG. 6; according to an embodiment.
Figure 7:
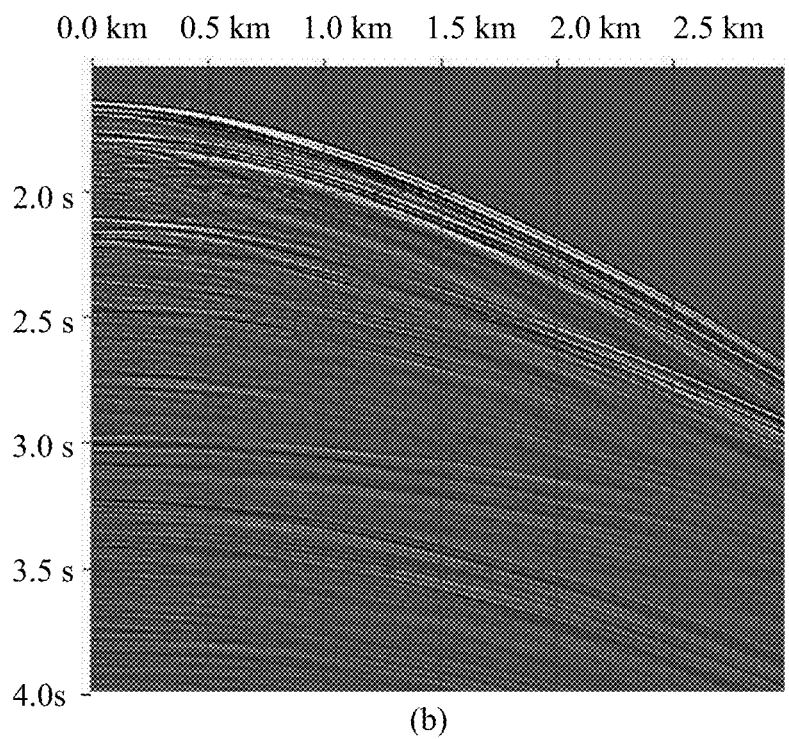

FIG. 7 illustrates (a) input raw shot with a bandpass of [2.5 Hz-80 Hz] and (b) reconstructed shot obtained using the estimated source wavelet in FIG. 4, with the estimated velocity and reflectivity models illustrated in FIG. 6. The modeling includes source wavelet, source and sensor ghosts, and water-surface multiples. The two shots are very similar, with a correlation over 0.96, which validates the present approach.

Figure 8:
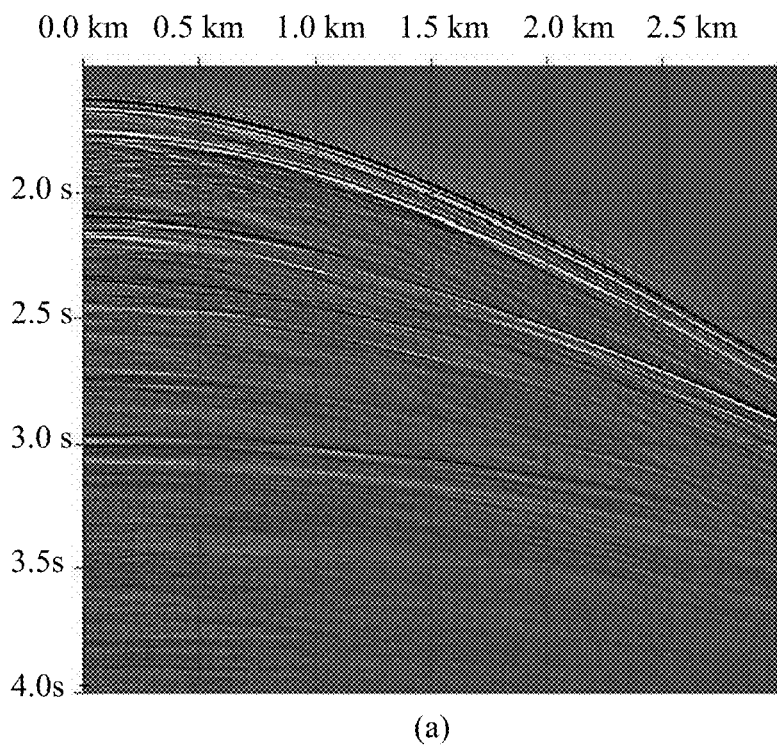
FIG. 8 illustrates (a) input raw shot and (b) the reconstructed shot obtained from (a) using conventional methods.
Figure 8:
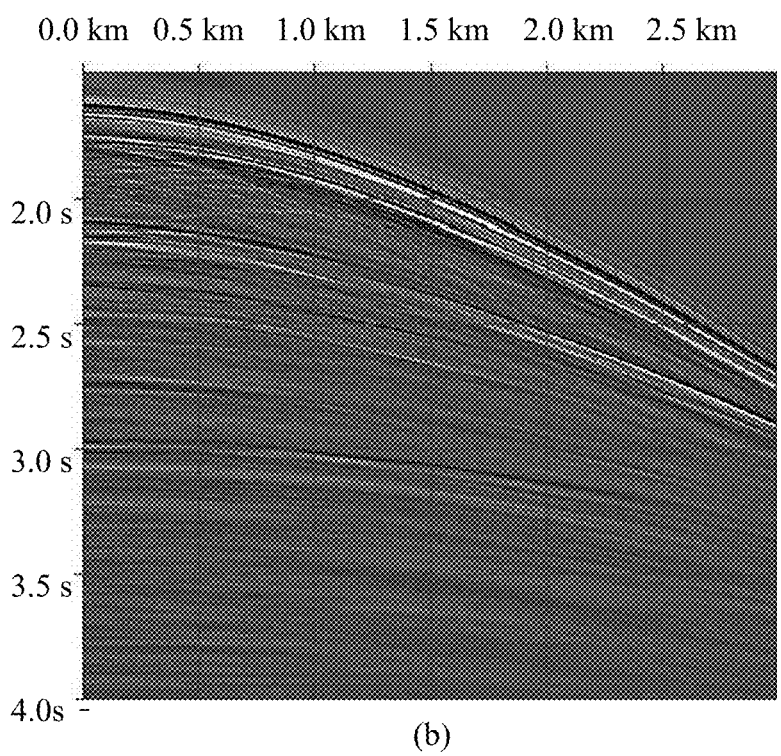

FIG. 8 illustrates (a) input raw shot of FIG. 7(a) conventionally processed with source deconvolution, source de-ghosting, sensor de-ghosting, and surface-related multiple attenuation, and (b) a corresponding reconstructed shot obtained using a Dirac wavelet as the source, the estimated velocity and reflectivity and a modeling without ghost or multiple modeling. The low frequency content obtained with the above-described methods is enhanced.

Figure 9:
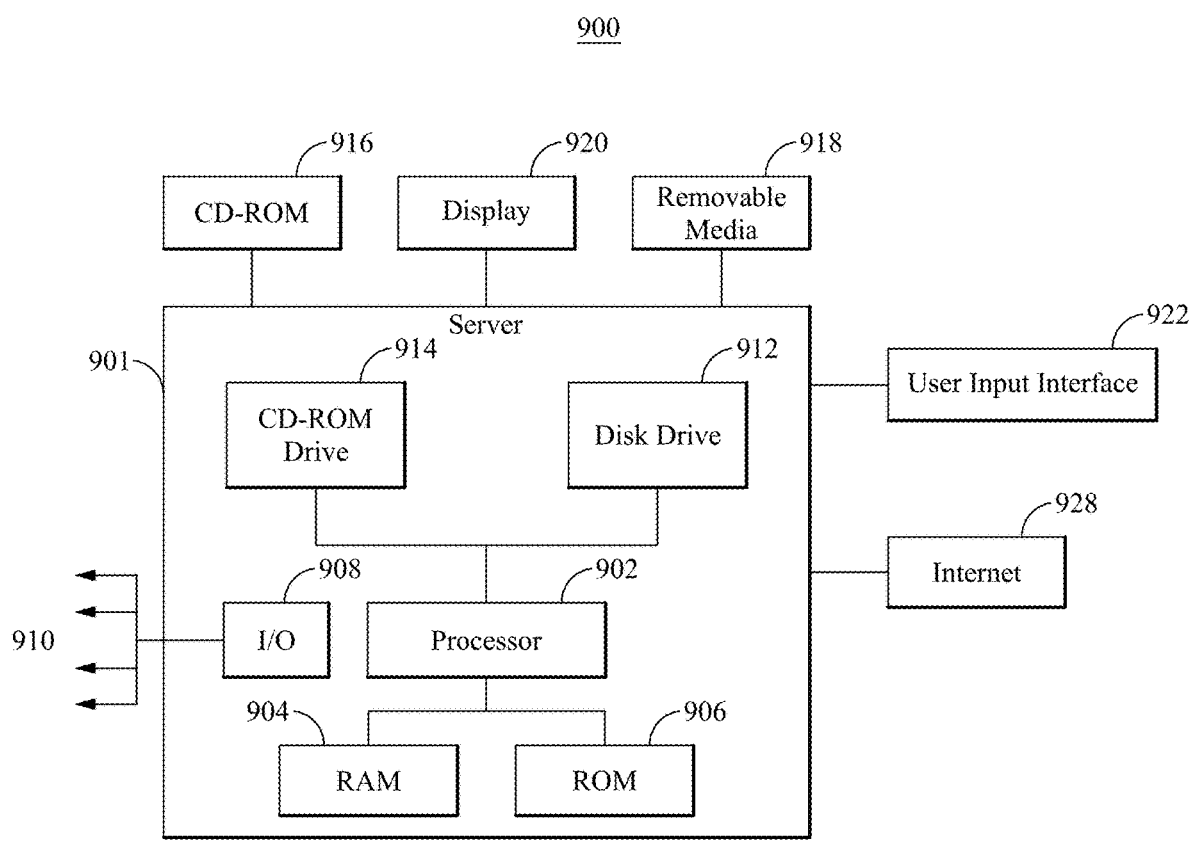
FIG. 9 is a schematic diagram of a seismic exploration apparatus, according to an embodiment.

The above-discussed methods may be implemented in a computing device 900 as illustrated in FIG. 9. Hardware, firmware, software or a combination thereof may be used to perform the various steps and operations described herein.

Computing device 900 suitable for performing the activities described in the exemplary embodiments includes a server 901 with a central processor (CPU) 902 that may be coupled to a random access memory (RAM) 904 and to a read-only memory (ROM) 906. ROM 906 may be replaced by other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other forms of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, sensors, etc. The server may be part of a larger network configuration as in a global area network (GAN) such as the Internet 928, which allows ultimate connection to various computing devices.

The disclosed exemplary embodiments provide methods devices for exploring a geological formation that use raw data in inversions and perform a joint inversion to estimate a source wavelet and reflectivity while keeping the velocity model unchanged. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for exploring a geological formation, the method comprising:
    obtaining shot records generated by sensors detecting signals emerging from the geological formation following shots fired by a source, and a velocity model of the geological formation;
    jointly estimating a multiple-inclusive source wavelet and a reflectivity model by performing an inversion minimizing difference between the shot records and modeled shots, the modeled shots including primaries and multiples obtained by propagating up-going and down-going wavefields through the velocity model that is not updated during the inversion; and
    converting the shot records into a geological product suitable for hydrocarbon exploration in the geological formation using the multiple-inclusive source wavelet and the reflectivity model.

2. The method of claim 1, wherein the primaries and the multiples for each of the modeled shots is computed by modeling a down-going wavefield from a source wavelet;
for a number of times, N,
propagating the down-going wavefield in the velocity model,
propagating an up-going wavefield, which is due to reflections of the down-going field, in the velocity model,
reflecting the up-going wavefield at a surface boundary to generate another down-going wavefield, and
generating components of the model shot by adding the up-going field and the other down-going wavefield at locations of the sensors,
wherein the other down-going field is the down-going field for a following iteration.

3. The method of claim 2, wherein the down-going wavefield modeled from the source wavelet includes a source ghost.

4. The method of claim 3, wherein a modeled shot $m_i$ at sensor i is expressed as $$m_i = dw_0 + \sum_{n=1}^{N} [(up_n(t) + dw_n(t))]$$

where $dw_0$ is direct arrival from the source to the sensor i, $up_n$, $dw_n$ are the components generated during n-th iteration.

5. The method of claim 4, wherein some of components of the modeled shot are adaptively subtracted from the raw shot to perform direct arrival attenuation, receiver ghost attenuation and/or multiple attenuation.

6. The method of claim 1, wherein the surface boundary is a water-air interface.

7. The method of claim 1, further comprising:
reflecting of the up-going wavefield at another surface boundary to generate a secondary down-going wavefield;
propagating the secondary down-going wavefield through the velocity model;
propagating a secondary up-going wavefield, which is due to reflections of the secondary down-going field, through the velocity model,
at least partially reflecting the secondary up-going wavefield at the surface boundary to generate a secondary other down-going wavefield, and
generating additional components of the model shot by adding the secondary up-going field and the secondary other down-going wavefield at the locations of the sensors,
wherein the surface boundary is above the locations of the sensors and the other surface boundary is below the locations of the sensors.

8. The method of claim 1, further comprising:
updating the velocity model and the reflectivity model by performing a second inversion using the estimated multiple-inclusive source wavelet, the second inversion minimizing a cost function including the difference between the input shots and the modeled shots and a reflectivity focusing term.

9. The method of claim 8, wherein the cost function C is $$C(r, v) = \frac{1}{2}[G(v)r - d_0]^*[G(v)r - d_0] + \frac{\sigma}{2}\|Ar\|^2$$

with $d_0$ data as recorded in the input shots, v is the velocity model, r is the reflectivity, and G(v) is a modeling operator that produces modeled data d of the model shots with a linear modeling equation $d=G(v)r$, and σ a weight.

10. The method of claim 8, wherein the shot records used by the inversion is a subset of all shot records acquired during a survey and used by the second inversion.

11. The method of claim 8, wherein the shot records used by the inversion correspond to a narrower frequency range than survey shot records used by the second inversion.

12. The method of claim 8, further comprising:
updating the reflectivity model only by performing a third inversion minimizing the difference between the shot records and the modeled shots.

13. A seismic exploration apparatus configured to convert shot records acquired for geological formation into a geological product suitable for hydrocarbon exploration in the geological formation, the apparatus comprising:
an interface configured to receive shot records generated by sensors detecting signals emerging from the geological formation following shots fired by a source, and a velocity model; and
a processing module connected to the interface and configured
to jointly estimate a multiple-inclusive source wavelet and a reflectivity model by performing an inversion minimizing difference between the shot records and modeled shots, the modeled shots including primaries and multiples obtained by propagating up-going and down-going wavefields through the velocity model that is not updated during the inversion, and
to convert the shot records into a geological product suitable for hydrocarbon exploration in the geological formation using the multiple-inclusive source wavelet and the reflectivity model.

14. The seismic exploration apparatus of claim 13, wherein the processing module computes the primaries and the multiples for each of the modeled shots by
modeling a down-going wavefield from a source wavelet;
for a number of times, N,
propagating the down-going wavefield in the velocity model,
propagating an up-going wavefield, which is due to reflections of the down-going field, in the velocity model,
reflecting the up-going wavefield at a surface boundary to generate another down-going wavefield, and
generating components of the model shot by adding the up-going field and the other down-going wavefield at locations of the sensors,
wherein the other down-going field is the down-going field for a following iteration.

15. The seismic exploration apparatus of claim 13, wherein a modeled shot $m_i$ at sensor i is expressed as $$m_i = dw_0 + \sum_{n=1}^{N} [(up_n(t) + dw_n(t))]$$

where $dw_0$ is direct arrival from the source to the sensor i, $up_n$ and $dw_n$ are the components generated during n-th iteration.

16. The seismic exploration apparatus of claim of claim 15, wherein the processing unit adaptively subtracts some components of the modeled shot from the raw shot to perform direct arrival attenuation, receiver ghost attenuation and/or multiple attenuation.

17. The seismic exploration apparatus of claim 13, wherein the surface boundary is a water-air interface.

18. The seismic exploration apparatus of claim 13, wherein the processing module further updates the velocity model and the reflectivity model by performing a second inversion using the estimated multiple-inclusive source wavelet, the second inversion minimizing a cost function including the difference between the input shots and the modeled shots and a reflectivity focusing term.

19. The seismic exploration apparatus of claim 18, wherein the processing module further 11 updates the reflectivity model only by performing a third inversion minimizing the difference between the shot records and the modeled shots.

20. A non-transitory computer-readable medium storing executable codes which, when executed by a computer, make the computer perform a method for exploring a geological formation, the method comprising:
    obtaining shot records generated by sensors detecting signals emerging from the geological formation following shots fired by a source, and a velocity model of the geological formation;
    jointly estimating a multiple-inclusive source wavelet and a reflectivity model by performing an inversion minimizing difference between the shot records and modeled shots, the modeled shots including direct arrivals, primaries, ghosts and multiples obtained by propagating up-going and down-going wavefields through the velocity model that is not updated during the inversion; and
    converting the shot records into a geological product suitable for hydrocarbon exploration in the geological formation using the multiple-inclusive source wavelet and the reflectivity model.

* * * * *